(12) United States Patent  
Green

(10) Patent No.: US 10,312,717 B2  
(45) Date of Patent: Jun. 4, 2019

(54) RECHARGING STAND FOR A SMART WATCH

(71) Applicant: Andrew Bradford Green, Mt. Pleasant, SC (US)

(72) Inventor: Andrew Bradford Green, Mt. Pleasant, SC (US)

(*) Notice: Subject to any disclaimer, the term of this patent is extended or adjusted under 35 U.S.C. 154(b) by 0 days.

(21) Appl. No.: 15/280,647

(22) Filed: Sep. 29, 2016

(65) Prior Publication Data

US 2017/0093200 A1    Mar. 30, 2017

Related U.S. Application Data

(60) Provisional application No. 62/234,109, filed on Sep. 29, 2015.

(51) Int. Cl.
| | | |
|---|---|---|
| *H02J 7/00* | (2006.01) | |
| *H02J 7/02* | (2016.01) | |
| *H02J 50/10* | (2016.01) | |

(52) U.S. Cl.
CPC ............ *H02J 7/025* (2013.01); *H02J 7/0044* (2013.01); *H02J 50/10* (2016.02)

(58) Field of Classification Search
USPC ........................................ 320/107, 108, 109
See application file for complete search history.

(56) References Cited

U.S. PATENT DOCUMENTS

| D762,650 | S | * | 8/2016 | Dang ........................... D14/434 |
|---|---|---|---|---|
| D776,053 | S | * | 1/2017 | Barnard ....................... D13/108 |
| D788,762 | S | * | 6/2017 | Kim ............................. D14/250 |
| D799,464 | S | * | 10/2017 | Zaihui ......................... D14/252 |
| D804,483 | S | * | 12/2017 | Minoli ......................... D14/434 |
| 2015/0196151 | A1 | * | 7/2015 | Phipps ................. B43K 23/001 |
| | | | | 211/85.1 |

* cited by examiner

*Primary Examiner* — Brian Ngo

(74) *Attorney, Agent, or Firm* — Wayne Edward Ramage; Baker Donelson

(57) ABSTRACT

A display and recharging apparatus for a smart watch or similar electronic device with a hollow base and an attached vertical holder. The vertical holder extends upward from the base at an angle. The vertical holder contains a gap that extends over a portion of the width of the vertical holder through which the lower watch band is routed to the back of the vertical holder. The upper band of the smart watch is draped over the top portion of the vertical holder. The back of the vertical holder also contains a space for a holding the recharging disk for the smart watch, which is oriented such that the smart watch charges while resting on the stand. The back of the vertical holder contains a cable channel that holds the recharging cable and extends down the length of the vertical holder and into the hollow base. The base contains a notch or gap that allows the recharging cable to exit the back of the base.

18 Claims, 4 Drawing Sheets

RECHARGING STAND FOR A SMART WATCH

This application claims the benefit of U.S. Provisional Patent Application No. 62/234,109, filed Sep. 29, 2015 by Andrew Green, and is entitled to that filing date for priority. The specification, figures, and complete disclosure of U.S. Provisional Application No. 62/234,109 are incorporated herein in their entireties by specific reference for all purposes.

FIELD OF INVENTION

This invention relates generally to a stand for a smart watch or similar portable electronic device. More particularly, this invention relates to a combination display and recharging stand for a smart watch or similar portable electronic device.

BACKGROUND OF THE INVENTION

Smart watches, such as the Apple Watch, are extremely versatile, stylishly designed timepieces that can be quite expensive, ranging from several hundred dollars to over a thousand dollars. These versatile devices require daily charging, which is typically performed at night. Many consumers prefer to showcase their smart watch and interact with their device while the smart watch is charging. However, the magnetic recharging disks require that the consumer lay their smartwatch on a horizontal surface while charging, which not only reduces the consumer's ability to take advantage of the watch's functionality but also prevents the consumer from readily viewing and accessing the display screen.

Accordingly, what is needed is a sturdy smart watch recharging stand that sufficiently secures a smart watch during recharging, is compatible with all watch bands, and simultaneously provides an angled display for optimal interaction with the timepiece.

SUMMARY OF THE INVENTION

In various exemplary embodiments, the present invention comprises a smart watch stand with a base and vertical holder. The vertical holder extends upward from the base at an angle, which may include, but is not limited to, a right angle. The vertical holder may be integrated with the base or separate. If separate, the vertical holder may be removably or permanently attached to the base, or may fit within a slot or groove in the base. In one embodiment, the bottom of the vertical holder may comprise one or more tabs that fit within slots in the base, and may be secured into place with one or more screws or other attachment means. The point of attachment may be closer to one end of the base (e.g., the front end) or may be centered. There may be multiple points of attachment.

In several embodiments, the vertical holder may comprise a notch, hole, slot, or gap extending across a portion of the width of the vertical holder. The gap may be centered in the holder with part of the holder on each side. In alternative embodiments, the gap may encompass one side of the holder, forming a three-sided notch with part of the holder on only one side.

The notch, hole, slot, or gap is adapted to receive one strap of the watch band. Such a configuration allows the lower strap of the watch band to be routed to the back of the vertical holder, securing the device to the stand. The other strap of the watch band is draped over the top of the vertical holder. In this position, the back of the watch body is securely positioned over a magnetic recharging disk, which recharges the smart watch while the watch is on the stand. The recharging disk is inserted into a hole or space on the back of the upper part of the stand, which may extend some or all of the way through the vertical holder. The hole may be lined with silicone or similar substance to hold the disk in place. Similarly, the top of the vertical holder and the sides of the notch, hole, slot or gap, may be lined with silicone or a similar substance to protect the watch body and band and help hold it in place.

The power cord or cable for the recharging disk is routed through a cable channel extending down the back of the vertical holder into a hollow space within the base. A removable lid covers the hollow space in the base. The cord extends out the back of the base. The stand thereby allows the user to quickly install and remove the recharging disk. The lid may be of the same material and color as the base, or may be different in material, color, and/or texture. In one embodiment, the lid is composed of leather or similar material (to provide a softer area where the band and buckle may rest).

The present invention thus allows a smart watch or similar device to be placed on the stand for recharging, while placing the watch body at an angle and height allowing it to be conveniently viewed and used in a stable position. The stand protects and manages all styles of bands, regardless of whether the band is buckled. Both straps or parts of the watch band are directed to the back of the stand, thereby keeping the front view clean and unrestricted.

DETAILED DESCRIPTION OF EXEMPLARY EMBODIMENTS

In various exemplary embodiments, as described herein, and as seen in FIGS. 1-4, the present invention comprises a base 2 with a vertical holder 4. The vertical holder extends upward from the base at an angle, which may include, but is not limited to, a right angle. In one embodiment, the angle between the vertical holder and base is between 45 degrees and 85 degrees. In one particular embodiment, the angle is 73 degrees. In several embodiments, the angle may be adjustable.

The vertical holder may be integrated with the base or separate. If separate, the vertical holder may be removably or permanently attached to the base or may fit within a slot or groove in the base. In one embodiment, the bottom of the vertical holder may comprise one or more tabs that fit within slots in the base, and may be secured into place with one or more screws or other attachment means. The point of attachment may be closer to one end of the base (e.g., the front end), or may be centered. There may be multiple points of attachment.

Figure 1:
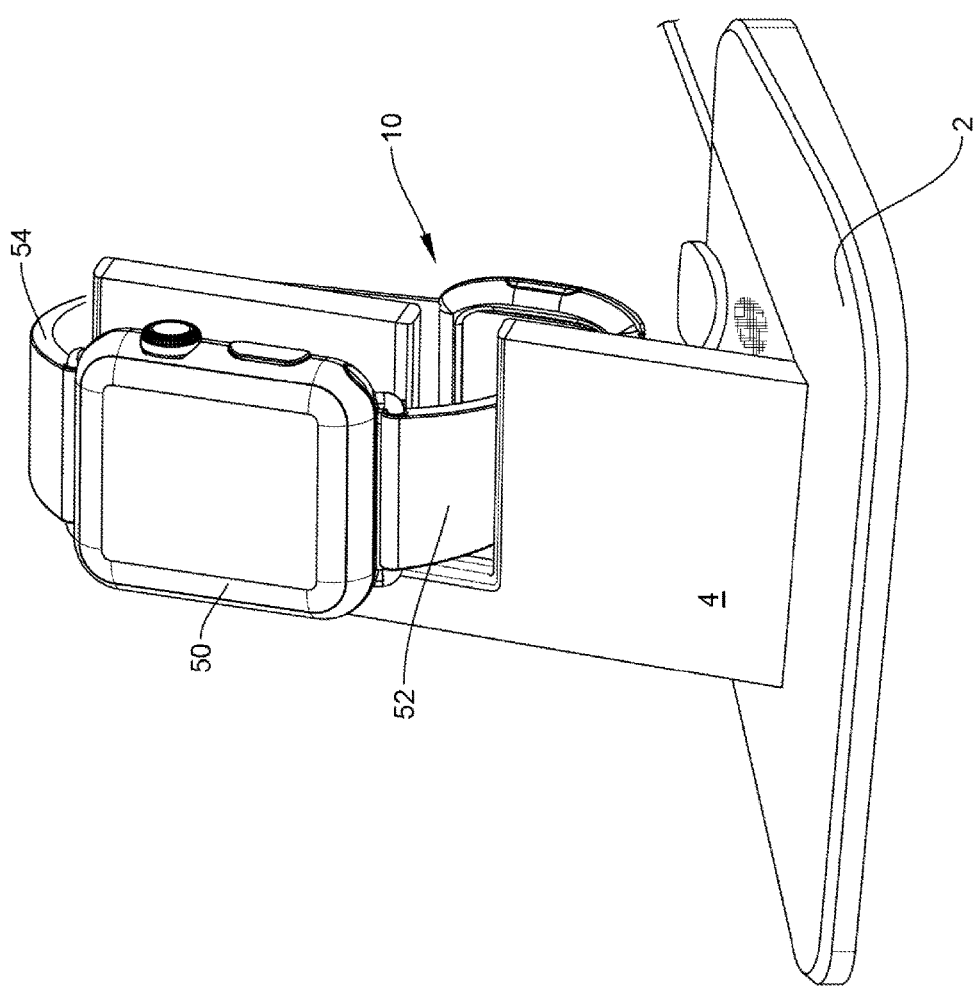
FIG. 1 shows a perspective view of a smart watch on a recharging stand in accordance with an exemplary embodiment of the present invention.
Figure 2:
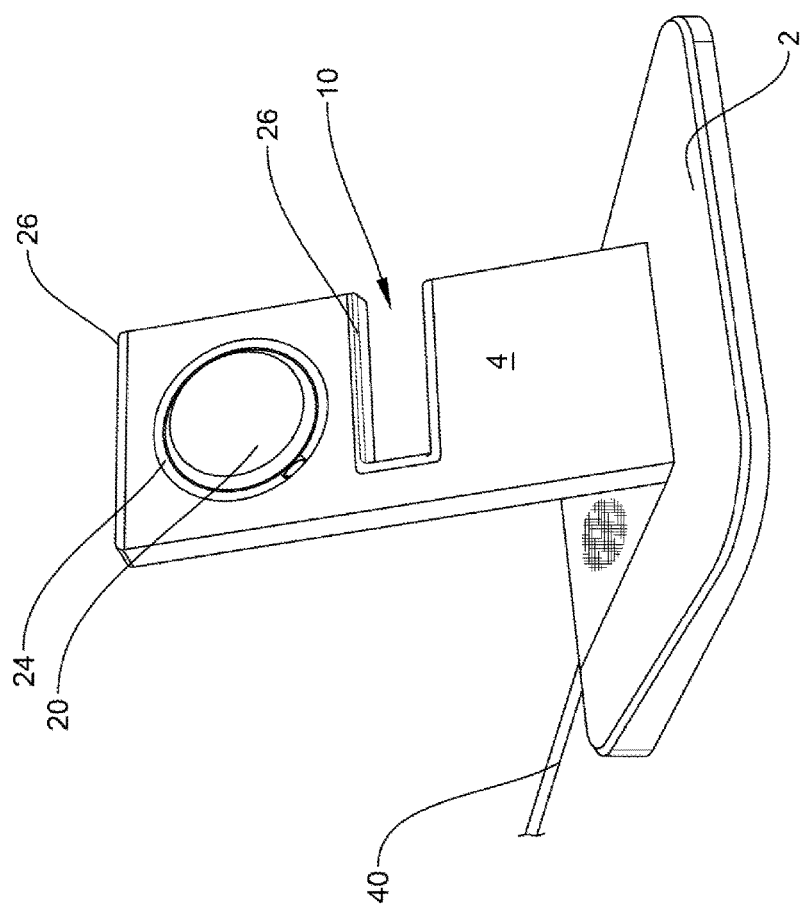
FIG. 2 shows another perspective view of the recharging stand of FIG. 1.
Figure 3:
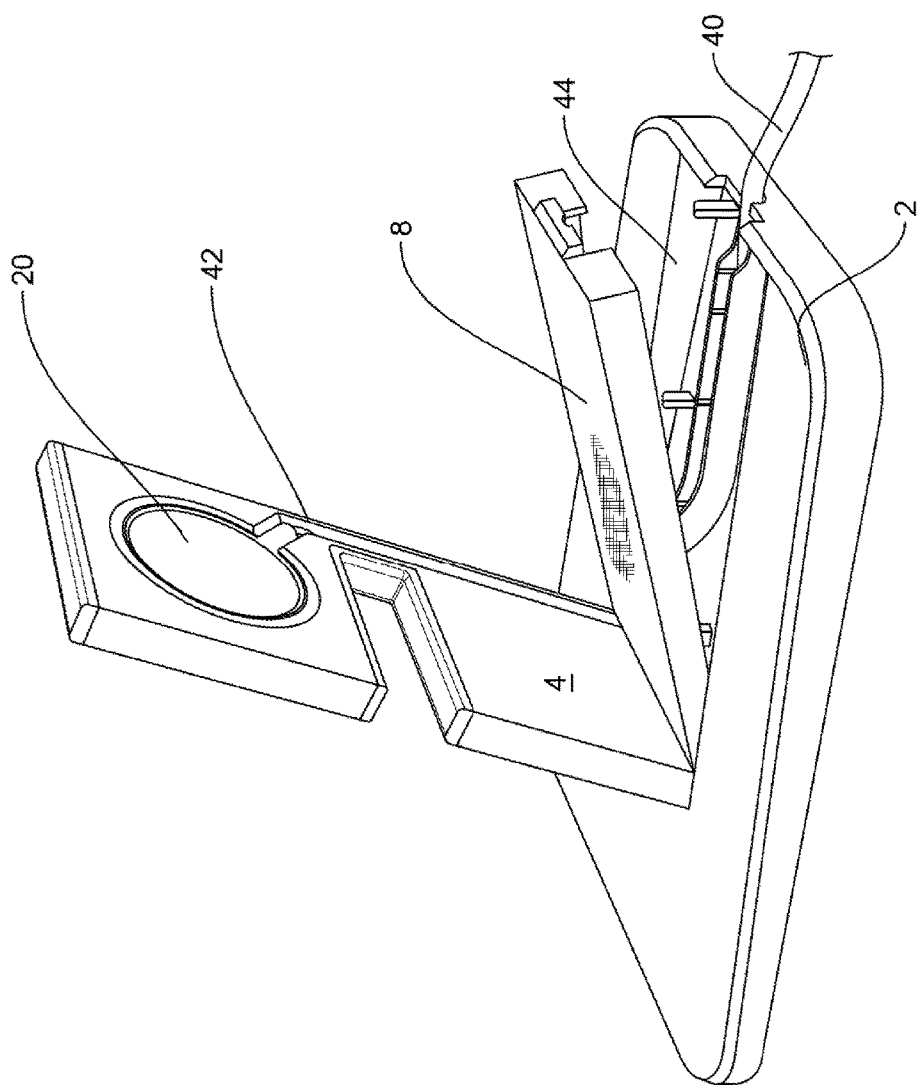
FIG. 3 shows a rear perspective view of the recharging stand of FIG. 1.
Figure 4:
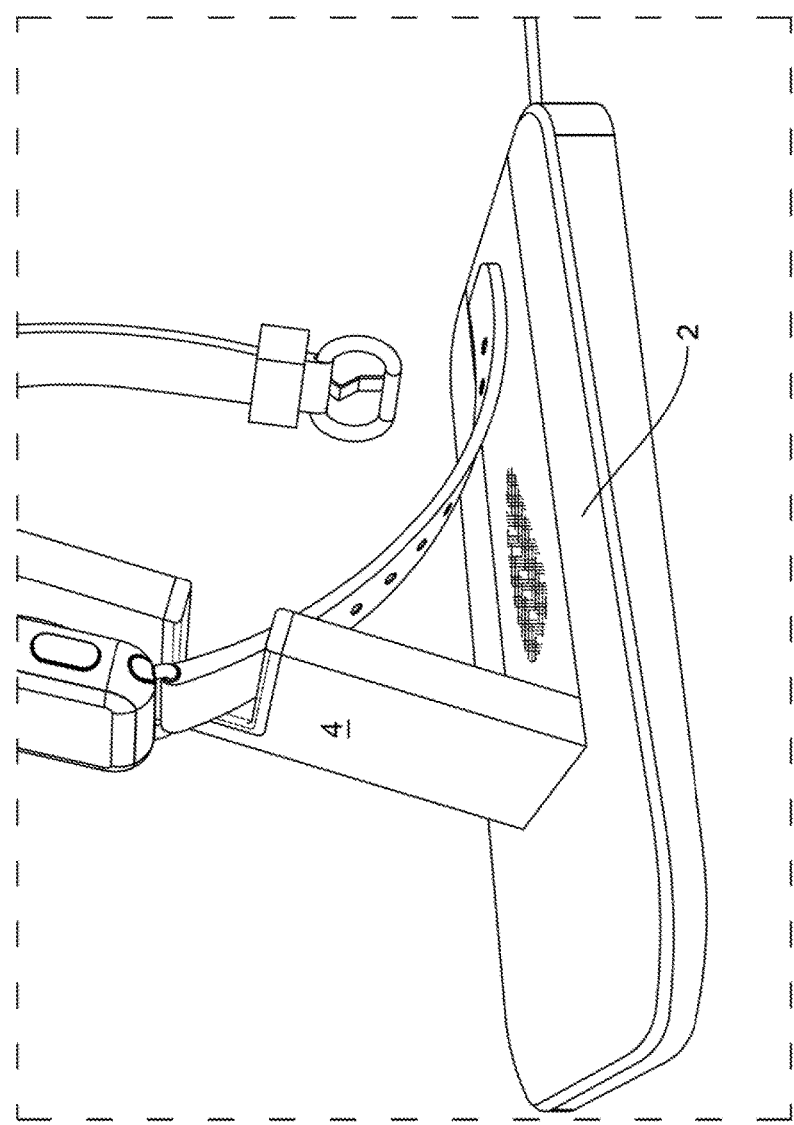
FIG. 4 shows a side perspective view of the bottom section of the recharging stand of FIG. 1.

In several exemplary embodiments, the vertical holder may comprise a notch, hole, slot, or gap 10 extending across a portion of the width of the vertical holder. In one embodiment, the gap may be centered in the holder, with part of the holder on each side. In another embodiment, as seen in FIG. 1, the gap may encompass one side of the holder, forming a three-sided notch with part of the holder on only one side.

In various embodiments, the notch, hole, slot, or gap is adapted to receive one strap 52 of the watch band. Such a configuration allows the lower strap of the watch band to be routed to the back of the vertical holder, securing the device to the stand. The other strap 54 of the watch band is draped over the top of the vertical holder. In this position, the back of the watch body 50 is securely positioned over a magnetic recharging disk 20, which recharges the smart watch while the watch is on the stand. The recharging disk is inserted into a hole or space on the back of the upper part of the stand, which may extend some or all of the way through the vertical holder. The hole may be lined with silicone 24 or similar substance to hold the disk in place. Similarly, the top of the vertical holder, and the sides of the notch, hole, slot or gap, may be lined with silicone 26 or a similar substance to protect the watch body and band, and help hold it in place.

In the embodiment shown, the power cord or cable 40 for the recharging disk is routed through a cable channel 42 extending down the back of the vertical holder into a hollow space 44 within the base. A removable lid 8 covers the hollow space in the base. The cord extends out the back of the base. The stand thereby allows the user to quickly install and remove the recharging disk. The lid may be of the same material and color as the base, or may be different in material, color, and/or texture. In one embodiment, the lid is composed of leather or similar material (to provide a softer area where the band and buckle may rest).

The base may be of any size or shape and may be of uniform or variable thickness. In one embodiment, the back of the base is thicker than the front, allowing room for the power cord or cable. Portions of the base may be weighted so as to provide stability. The base may be of suitable width to provide lateral stability, and suitable depth to provide longitudinal stability. The bottom of the base may comprise a non-slip rubber layer or surface.

The present invention may be made of any suitable material, including, but not limited to, metal, wood, ceramic, plastic, or combinations thereof. It also may be provided in a variety of colors or textures, or combinations thereof.

In one exemplary embodiment, the base is approximately 3.9 inches wide and approximately 4.76 inches long, and the vertical holder is approximately 3.74 inches in height. The stand weighs approximately 0.4 pounds.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus, comprising:
    a base with a top, bottom, front, and back containing an interior hollow space; and
    a vertical holder with a front face, back face, top, and bottom that is attached to said base and extends upward from said base at an angle;
    said vertical holder containing a space through the front and back face of the vertical holder that extends partially across the front face and back face of the vertical holder;
    said vertical holder containing a hole extending through the back face of the vertical holder wherein said hole is configured to receive and hold a recharging disk;
    said base containing a gap extending across a portion of the width of the back of said base; and
    said base containing a removable lid that covers said hollow space.

2. The apparatus set forth in claim 1 wherein said hole extending through the back face of the vertical holder also extends through the front face of the vertical holder.

3. The apparatus set forth in claim 1 wherein the vertical holder is removably attached to the base.

4. The apparatus set forth in claim 1 wherein the vertical holder extends upward from said base at an angle from about 45° to about 90°.

5. The apparatus set forth in claim 1 wherein the angle of the vertical holder is adjustable.

6. The apparatus set forth in claim 1 wherein said vertical holder contains a cable channel along the back face of the vertical holder.

7. The apparatus set forth in claim 1 wherein the removable lid is comprised of leather or similar material.

8. The apparatus set forth in claim 1 wherein said gap extending across a portion of the width of the back of said base is configured to allow a cable of a recharging disk to exit the back portion of the base.

9. The apparatus set forth in claim 1 wherein any one or combination of the following are lined with silicone or a similar substance: the top of said vertical holder, said space through the vertical holder, said hole extending through the back face of the vertical holder, and said gap extending across a portion of the width of the back of the base.

10. The apparatus set forth in claim 1 wherein the apparatus is constructed of metal, wood, ceramic, plastic, or combinations thereof.

11. A watch stand, comprising:
    a base with a top and a bottom; and
    a holder with a top end, a bottom end, a right side, a left side, a front face and a back face, extending upward from the top of the base, the holder further comprising a hole extending through the front and back face, and an opening extending from the right side or left side partially across the front and back face;
    wherein the base comprises a compartment.

12. The watch stand of claim 11, further comprising a cable channel in the back face.

13. The watch stand of claim 12, wherein the cable channel extends from the hole to the bottom end of the holder.

14. The watch stand of claim 11, wherein the hole in the holder is disposed closer to the top end of the holder than the opening.

15. The watch stand of claim 11, wherein the hole is circular.

16. The watch stand of claim 11, wherein the hole is configured to securely hold a recharging disk.

17. The watch stand of claim 11, wherein the base is hollow in whole or in part.

18. The watch stand of claim 11, further comprising a compartment lid.

* * * * *